(12) United States Patent
Lin

(10) Patent No.: US 9,535,917 B1
(45) Date of Patent: Jan. 3, 2017

(54) DETECTION OF ANOMALOUS UTILITY USAGE

(71) Applicant: EMC Corporation, Hopkinton, MA (US)

(72) Inventor: Derek Lin, San Mateo, CA (US)

(73) Assignee: EMC Corporation, Hopkinton, MA (US)

( * ) Notice: Subject to any disclaimer, the term of this patent is extended or adjusted under 35 U.S.C. 154(b) by 63 days.

(21) Appl. No.: 13/631,298

(22) Filed: Sep. 28, 2012

(51) Int. Cl.
*G06F 17/30* (2006.01)
*G06F 17/27* (2006.01)

(52) U.S. Cl.
CPC ..... *G06F 17/30106* (2013.01); *G06F 17/2715* (2013.01)

(58) Field of Classification Search
CPC .................. G06F 17/30864; G06F 17/30867
USPC .................... 707/758, 688, 690, 692, 700
See application file for complete search history.

(56) References Cited

U.S. PATENT DOCUMENTS

| | | | | |
|---|---|---|---|---|
| 6,671,636 B2 * | 12/2003 | Dawson | ................. | G01R 11/25 |
| | | | | 340/870.02 |
| 7,733,245 B2 * | 6/2010 | Spencer | ................. | H04B 3/546 |
| | | | | 341/50 |
| 8,103,467 B2 * | 1/2012 | Taft | ................. | 702/64 |
| 8,140,414 B2 * | 3/2012 | O'Neil | ................. | G01D 4/004 |
| | | | | 340/870.02 |
| 8,407,115 B2 * | 3/2013 | O'Neil | ................. | G01D 4/002 |
| | | | | 705/30 |
| 2002/0184235 A1 * | 12/2002 | Young | ................. | G01V 1/00 |
| 2007/0247789 A1 * | 10/2007 | Benson | ................. | G01D 4/006 |
| | | | | 361/672 |
| 2009/0126003 A1 * | 5/2009 | Touboul | ................. | H04L 29/1233 |
| | | | | 726/13 |
| 2009/0281679 A1 * | 11/2009 | Taft | ................. | G01D 4/004 |
| | | | | 700/297 |
| 2010/0257580 A1 * | 10/2010 | Zhao | ................. | H04L 12/2602 |
| | | | | 726/1 |
| 2010/0283606 A1 * | 11/2010 | Tsypin | ................. | G06Q 30/02 |
| | | | | 340/540 |
| 2011/0178937 A1 * | 7/2011 | Bowman | ................. | G06Q 10/00 |
| | | | | 705/314 |
| 2011/0231320 A1 * | 9/2011 | Irving | ................. | G06Q 30/00 |
| | | | | 705/80 |
| 2011/0288692 A1 * | 11/2011 | Scott | ................. | G06F 21/55 |
| | | | | 700/297 |
| 2012/0089356 A1 * | 4/2012 | Taft | ................. | G01R 19/2513 |
| | | | | 702/64 |
| 2012/0197911 A1 * | 8/2012 | Banka | ................. | G06F 17/30864 |
| | | | | 707/752 |
| 2012/0223840 A1 * | 9/2012 | Guymon | ................. | H04B 3/54 |
| | | | | 340/870.02 |
| 2013/0151979 A1 * | 6/2013 | Snider et al. | ................. | 715/738 |

(Continued)

*Primary Examiner* — Pierre Vital
*Assistant Examiner* — Nargis Sultana
(74) *Attorney, Agent, or Firm* — Barry N. Young

(57) ABSTRACT

Detecting for anomalous utility usage, including: determining with respect to the subject set of utility usage data a portion that is not associated with a predetermined set of significant components; determining that the portion that is not associated with the predetermined set of significant components exceeds a prescribed threshold; and concluding, based at least in part on the determination that the portion that is not associated with the predetermined set of significant components exceeds the prescribed threshold, that the subject set of utility usage data is anomalous.

20 Claims, 12 Drawing Sheets

(56) References Cited

U.S. PATENT DOCUMENTS

| | | | | |
|---|---|---|---|---|
| 2013/0229947 A1* | 9/2013 | Vaswani | ................ | G01D 4/004 370/254 |
| 2013/0271289 A1* | 10/2013 | Hampapur | ............. | G01D 4/004 340/870.02 |
| 2014/0214221 A1* | 7/2014 | Matthews | .............. | G01D 4/004 700/291 |

* cited by examiner $$\begin{bmatrix} f_1 & f_2 & f_3 & f_4 & \ldots & f_n \end{bmatrix}$$

$$X_{m \times n}$$

$$=$$

$$\begin{bmatrix} eig_1 & eig_2 & \ldots & eig_m \end{bmatrix} \begin{bmatrix} d_1 & & & 0 \\ 0 & d_2 & & \\ & & \ldots & \\ & & & d_m \end{bmatrix} \begin{bmatrix} EIG_1 & EIG_2 & \ldots & EIG_n \end{bmatrix}$$

$$U_{m \times m} \qquad D_{m \times n} \qquad V^T_{n \times n}$$

FIG. 12

DETECTION OF ANOMALOUS UTILITY USAGE

BACKGROUND OF THE INVENTION

Utility usage may be monitored using devices such as meters. For example, different meters may be configured to detect usages of different types of utilities such as electricity, water, and gas. While homeowners and business proprietors may occasionally check on the readings on their utility usage meters, one may not be able to readily discern whether utility usage at any point in time is unusual and potentially indicative of unauthorized use such as theft by a third party.

BRIEF SUMMARY OF THE INVENTION

Detecting for anomalous utility usage is described. A portion with respect to a subject set of utility usage data that is not associated with a predetermined set of significant components is determined. Whether the portion that is not associated with the predetermined set of significant components exceeds a prescribed threshold is determined. Whether the subject set of utility usage data is anomalous is based at least in part on the determination whether the portion that is not associated with the predetermined set of significant components exceeds the prescribed threshold.

BRIEF DESCRIPTION OF THE DRAWINGS

Various embodiments of the invention are disclosed in the following detailed description and the accompanying drawings.

FIG. 12 is a diagram showing an example of singular value decomposition.

DETAILED DESCRIPTION

Figure 1:
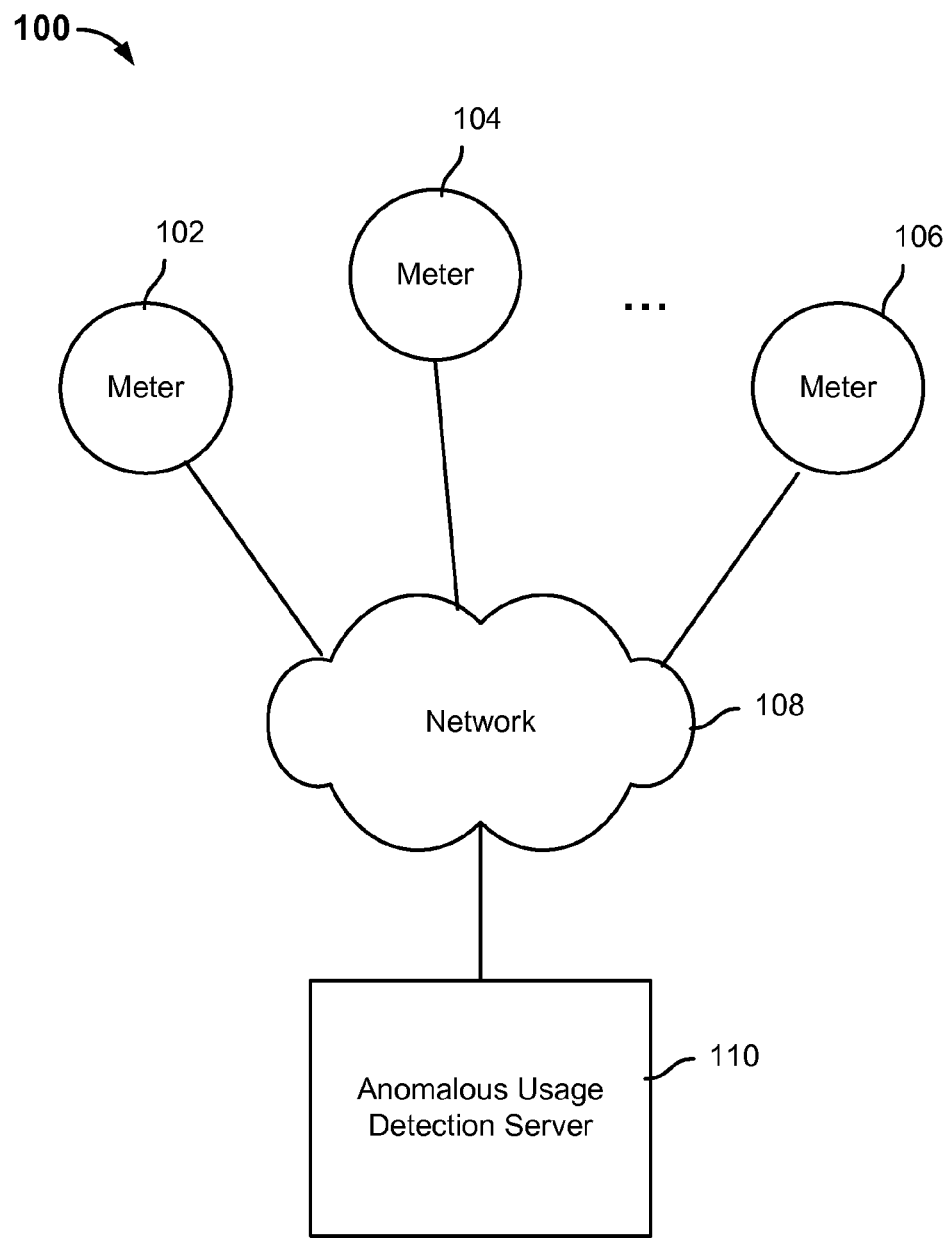
FIG. 1 is a system for detecting anomalous utility usage.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting anomalous utility usage is described herein. In some embodiments, a training signal that is based at least in part on historical utility usage data is decomposed into a set of significant components. In some embodiments, a training signal comprises a series of data samples, each associated with a time indication. For example, the historical utility usage data may be associated with historical readings from a particular meter. In another example, the historical utility usage data may be associated with historical readings from a group of multiple meters. In some embodiments, it is determined whether a subject set of utility usage data is considered to be anomalous given the set of significant components decomposed from the training signal. In some embodiments, the subject set of utility usage data also comprises a series of data samples, each associated with a time indication. In some embodiments, the subject set of utility usage data is considered to be anomalous based at least in part on a determination that a portion of the subject set of utility usage data that is outside of the set of significant components exceeds a prescribed threshold. In some embodiments, a subject set of utility usage data that is considered to be anomalous is flagged for further inspection.

FIG. 1 is a system for detecting anomalous utility usage. In the example, system 100 includes meters 102, 104, and 106, network 108, and anomalous usage detection server 110. Network 108 may include high speed data and/or telecommunications networks. While only meters 102, 104, and 106 are shown in the example, system 100 may include more or fewer meters.

Each of meters 102, 104, and 106 is configured to measure and produce corresponding readings of at least one type of utility usage. For example, each of meters 102, 104, and 106 may be installed inside or outside of a building (e.g., private residence or commercial building) at which utilities are consumed. For example, types of utilities may include electricity, water, and gas. Each of meters 102, 104, and 106 is configured to produce readings at the same or different time intervals (e.g., one of meters 102, 104, and 106 may produce a reading every 30 minutes and another one of meters 102, 104, and 106 may produce a reading every 15 minutes). A reading may include a time indication (e.g., timestamp) and an amount of utility used at the time the reading was taken. Meters 102, 104, and 106 may be geographically proximate or remote from each other. In some embodiments, at least some of meters 102, 104, and 106 (and other meters that are not shown) are determined to form a group of meters (e.g., based on a common attribute such as geographic proximity, for example) such that the collective readings of all the meters in the group may be analyzed together.

Anomalous usage detection server 110 is configured to communicate with at least meters 102, 104, and 106. In some embodiments, anomalous usage detection server 110 is configured to store the periodic readings from at least meters 102, 104, and 106. For example, each of meters 102, 104, and 106 may send each reading to anomalous usage detection server 110 or may accrue several readings and send a batch of several readings to anomalous usage detection server 110 at once. In some embodiments, anomalous usage detection server 110 is configured to analyze the stored readings (e.g., from a certain window of time in the past) to determine patterns in the data. In some embodiments, the analyzed stored readings may be associated with a particular meter. In some other embodiments, the analyzed stored readings may be associated with the various meters within a determined group of meters. Because the number of readings to analyze may be great, anomalous usage detection server 110 may optionally perform a transform on the readings to reduce the number of samples. A training signal (e.g., a series of data samples with corresponding time indications) based on the readings of transformed samples are then decomposed by anomalous usage detection server 110 into at least a set of significant components. For example, anomalous usage detection server 110 may be configured to perform principal component analysis on the training signal to determine the set of significant components. In some embodiments, the set of significant components may include a selected subset of the components into which the training signal was decomposed. Anomalous usage detection server 110 may use the set of significant components to represent what is considered the "normal" (or not "anomalous") readings from the meter(s) from which the historical utility usage readings were analyzed.

In some embodiments, anomalous usage detection server 110 is configured to determine whether a subject set of utility usage data is anomalous given the set of significant components derived from the training signal. In the event the subject set of utility usage data is associated with a single meter, the set of significant components that was derived from a training signal associated with that meter is used. In the event the subject set of utility usage data is associated with a group of meters, the set of significant components that was derived from a training signal associated with that group of meter is used. In various embodiments, a subject set of utility usage data is determined to be "anomalous" (or not "normal") if the portion of the subject set of utility usage data that is outside of the set of significant components exceeds a prescribed threshold. In some embodiments, this portion of the subject set of utility usage data that is outside of the set of significant components is considered to represent what should be the less significant components of the subject set so if these components are greater than the prescribed threshold, then the subject set is determined to be anomalous. Data that is anomalous may indicate the occurrence of illicit/unauthorized actions, such as utility theft. In some embodiments, the prescribed threshold is determined based at least in part on the portion of the training signal that is outside of the determined set of significant components.

Figure 2:
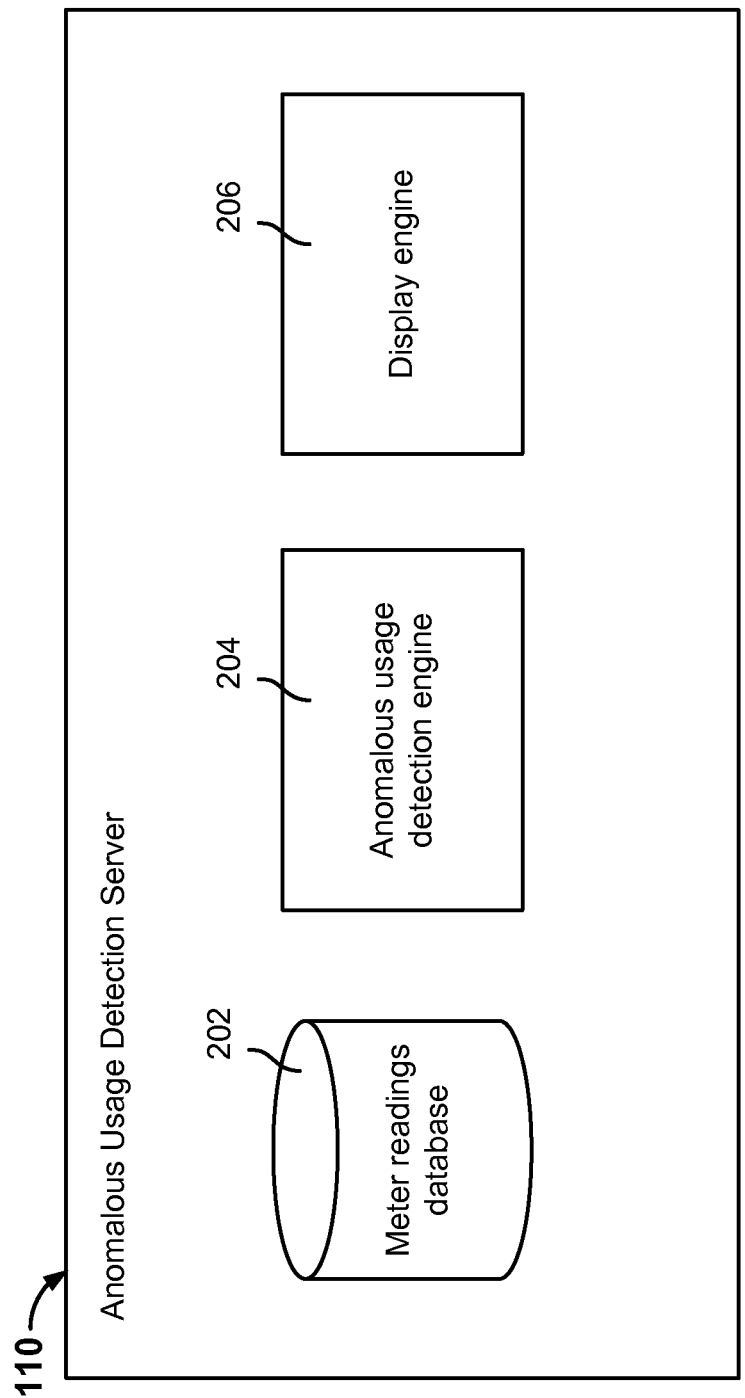
FIG. 2 is a diagram showing an example of an anomalous usage detection server.

FIG. 2 is a diagram showing an example of an anomalous usage detection server. In some embodiments, anomalous usage detection server 110 of system 100 may be implemented using the example. The anomalous usage detection server of the example includes meter readings database 202, anomalous usage detection engine 204, and display engine 206. Meter readings database 202 may be implemented using one or more databases. Each of anomalous usage detection engine 204 and display engine 206 may be implemented using one or both of hardware and software.

Meter readings database 202 is configured to store readings produced by one or more meters. For example, each reading may be associated with information identifying the meter that produced it, a time indication, and the utility usage at the time the reading was taken. In some embodiments, each meter produces a reading at every configured time interval (e.g., the time interval may be configured by a user that is associated with the meter). In some embodiments, the meter readings may be sent to the anomalous usage detection server by the meters that produced them.

Anomalous usage detection engine 204 is configured to determine whether a subject set of utility usage data is determined to be anomalous based at least in part on historical utility usage data. In various embodiments, anomalous usage detection engine 204 is configured to use historical utility usage data including at least some meter readings stored at meter readings database 202. In some embodiments, periodically, anomalous usage detection engine 204 is configured to determine a training signal using retrieved stored meter readings associated with a certain window of time in the past (e.g., the window of time may be the last two months). In some embodiments, the retrieved stored meter readings may be associated with a single meter. In some embodiments, the retrieved stored meter readings may be associated with any meter within a determined group of meters. In some embodiments, anomalous usage detection engine 204 is configured to use the retrieved meter readings as the training signal without performing a transformation on them. In some embodiments, anomalous usage detection engine 204 is configured to perform a transformation (e.g., a transformation of the readings from the time domain to the frequency domain) on the retrieved meter readings and use the transformed samples as the training signal. In some embodiments, anomalous usage detection engine 204 is configured to compute statistical summaries from the retrieved meter readings and use the computed statistical summaries as the training signal. Anomalous usage detection engine 204 is configured to decompose the training signal into at least a set of significant components. For example, anomalous usage detection engine 204 is configured to decompose the training signal using the technique of principal component analysis. Each significant component represents a characteristic of the training signal and the set of significant components may be a subset chosen from a greater number of components into which the training signal was decomposed. The set of significant components may be chosen based on a configured parameter, as will be described further below. The set of significant components may be considered to represent utility usage data that is normal (or not anomalous).

In determining whether the subject set of utility usage data is anomalous, anomalous usage detection engine 204 is configured to use a set of significant components that is appropriate to the subject set. In some embodiments, in the event that a transform or other type of modification/derivation was performed on the historical meter readings, the same type of transform or modification/derivation is performed on the subject set. In some embodiments, if the subject set of utility usage data is associated with a single meter, then anomalous usage detection engine 204 is configured to use the set of significant components derived from meter readings associated with that meter. Or, if the subject set of utility usage data is associated with a group of meters, then anomalous usage detection engine 204 is configured to use the set of significant components derived from meter readings associated with that group of meters. In some embodiments, the subject set of utility usage data comprises a set of stored meter readings associated with a time period and may be retrieved from meter readings database 202. In some embodiments, the subject utility usage data is associated with a time period that is within the window of time associated with the historical utility usage data from which the set of significant components was derived. For example, if the historical utility usage data included meter readings that were made at 30 minute intervals from Jan. 1, 2012 to Mar. 1, 2012, then the subject set of utility usage data may be associated with the meter readings made on the day of Feb. 12, 2012. That is to say that even though the subject set of utility usage data was actually included in the set of historical utility usage data from which the set of significant components were derived, a determination can still be made as to whether that particular subject set of utility usage data was anomalous given the utility usage data associated with the historical window of time. In some other embodiments, the subject utility usage data is associated with a time period that is subsequent to the window of time associated with the historical utility usage data from which the set of significant components was derived. For example, if the historical utility usage data included meter readings made at 30 minute intervals from Jan. 1, 2012 to Mar. 1, 2012, then the subject set of utility usage data may be associated with the meter readings made on the day of Apr. 22, 2012.

In some embodiments, anomalous usage detection engine 204 is configured to determine that a subject set of utility usage data is anomalous if the portion of the subject set of utility usage data that is outside of the set of significant components exceeds a prescribed threshold. In some embodiments, the "portion of the subject set of utility usage data that is outside of the set of significant components" refers to a portion of the subject set that deviates from the components of the training data that represents the normal data and therefore should not be very significant. While not all such deviations are considered anomalous, a value may be prescribed to set as a threshold for determining that a subject set is anomalous. In other words, a subject set is considered to be anomalous by virtue of if its deviation from the normal data (as represented by the set of significant components) exceeds a set threshold. In some embodiments, anomalous usage detection engine 204 is configured to determine the prescribed threshold based at least in part on a portion of the training signal that is outside of the set of significant components. Anomalous sets of data do not guarantee to indicate undesirable or unauthorized behavior associated with the utility usage, but are considered to be possibly indicative of undesirable or unauthorized behavior. An example of unauthorized behavior may include theft of utilities. In some embodiments, subject sets of utility usage data that are considered to be anomalous are flagged and corresponding alerts are sent to notify users to further inspect the subject sets.

Display engine 206 is configured to display at a user interface alerts associated with subject sets of utility usage data that are determined to be anomalous. For example, such alerts may include information associated with subject sets of utility usage data that are determined to be anomalous by anomalous usage detection engine 204. In some embodiments, information associated with the subject set of utility usage data may include information identifying the time period over which meter readings of the subject set were made, information identifying the meter at which the readings were made, and the amount over which the data associated with the subject set that is outside of the set of significant components exceeded the prescribed threshold, for example.

Figure 3:
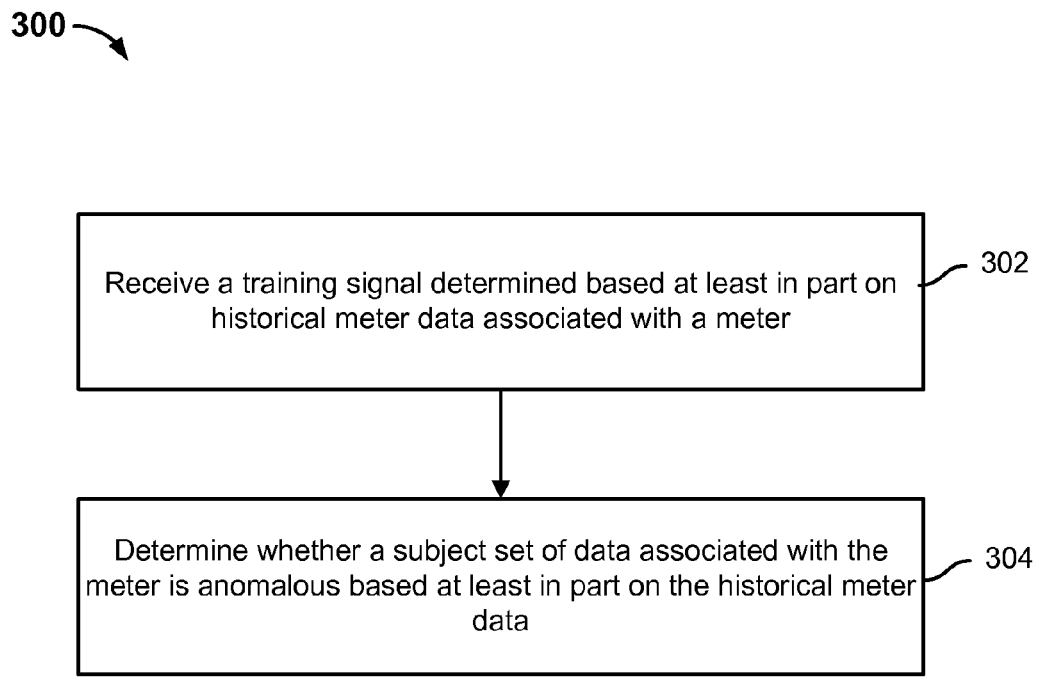
FIG. 3 is a flow diagram showing an embodiment of a process for determining whether a subject set of utility usage data associated with a single meter is anomalous.

FIG. 3 is a flow diagram showing an embodiment of a process for determining whether a subject set of utility usage data associated with a single meter is anomalous. In some embodiments, process 300 may be implemented at system 100.

Process 300 may be used when anomalous subject sets of utility usage data are determined with respect to a single meter.

At 302, a training signal determined based at least in part on historical meter data associated with a meter is received. For example, the meter readings associated with this particular meter associated with a historical window of time may be retrieved from storage. Each meter reading may be associated with a time indication. In some embodiments, the set of historical meter readings may be transformed into a different spectrum (e.g., frequency) and reduced to a fewer number of transformed samples. In some embodiments, regardless of whether the historical meter readings are modified, the modified or unmodified set of historical meter readings can be used as a training signal. The training signal is decomposed into at least a set of significant components that is used to represent the normal portion of the training signal.

For example, a particular meter produces readings every 30 minutes and so 48 readings are recorded each day. After readings from the meter are collected and stored for a while, the set of historical readings from two past months (e.g., from Jan. 1, 2012 to Mar. 1, 2012) is retrieved from storage and a set of significant components may be decomposed from the historical meter data.

At 304, it is determined whether a subject set of data associated with the meter is anomalous based at least in part on the historical meter data. In some embodiments, a subject set of data associated with the same meter is compared against the set of significant components to determine whether the subject set is anomalous based on the set of significant components, as will be further discussed below.

Returning to the previous example, a subject set comprising the readings from that meter for a particular day is considered. For example, the subject set may comprise the 48 meter readings taken on Apr. 22, 2012.

Figure 4:
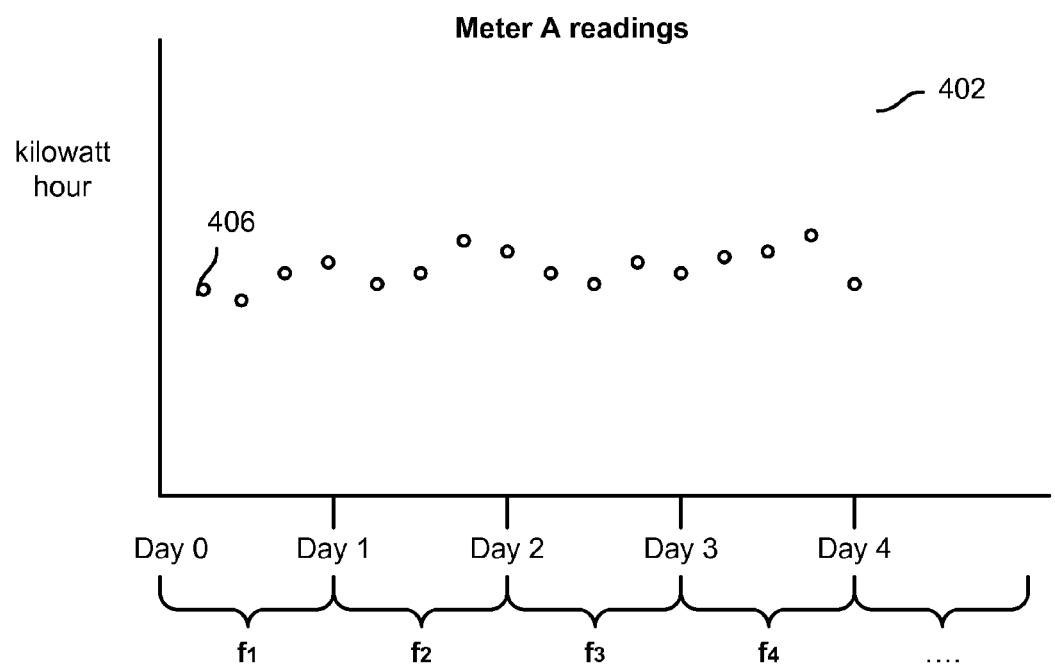
FIG. 4 shows an example of representing a training signal associated with a single meter in matrix form on the data.
Figure 4:
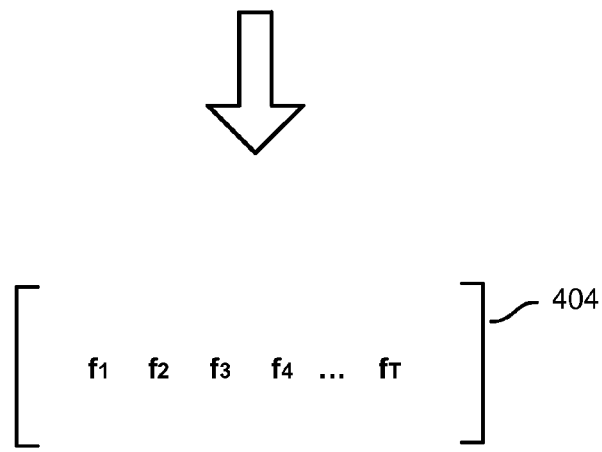

FIG. 4 shows an example of representing a training signal associated with a single meter in matrix form on the data. Sometimes, placing data in matrix form will facilitate the use of analysis techniques. In this example, the meter under consideration is referred to as Meter A. In the example, Meter A measures energy usage in units of kilowatt hours. In the example, 402 shows the meter readings made by Meter A over the course of Days 1, 2, 3, 4, . . . , T (not shown). In the example, Meter A takes 4 readings a day (or one reading once every 6 hours) and each such reading is represented by a plotted point such as point 406. While the meter readings may be modified (e.g., transformed into a different domain) in other examples, the meter readings (data samples) across each day in this example are directly placed into a corresponding feature vector (without being modified). For example, the four meter readings from Day 1 may be placed into feature vector $f_1$, the four meter readings from Day 2 may be placed into feature vector $f_2$, the four meter readings from Day 3 may be placed into feature vector $f_3$, the four meter readings from Day 4 may be placed into feature vector $f_4$, and so forth. Then the feature vectors may be placed into feature matrix 404, where each feature vector forms a column in matrix 404. As such, a training signal associated with historical utility usage data may be set up in a matrix such as feature matrix 404 prior to being decomposed into significant components. In this example, a subject set of utility usage data to be determined for anomalous behavior may comprise a feature vector including meter readings associated with Meter A and taken at the same resolution (four readings a day, one every 6 hours) as the meter readings in the historical meter data.

Figure 5:
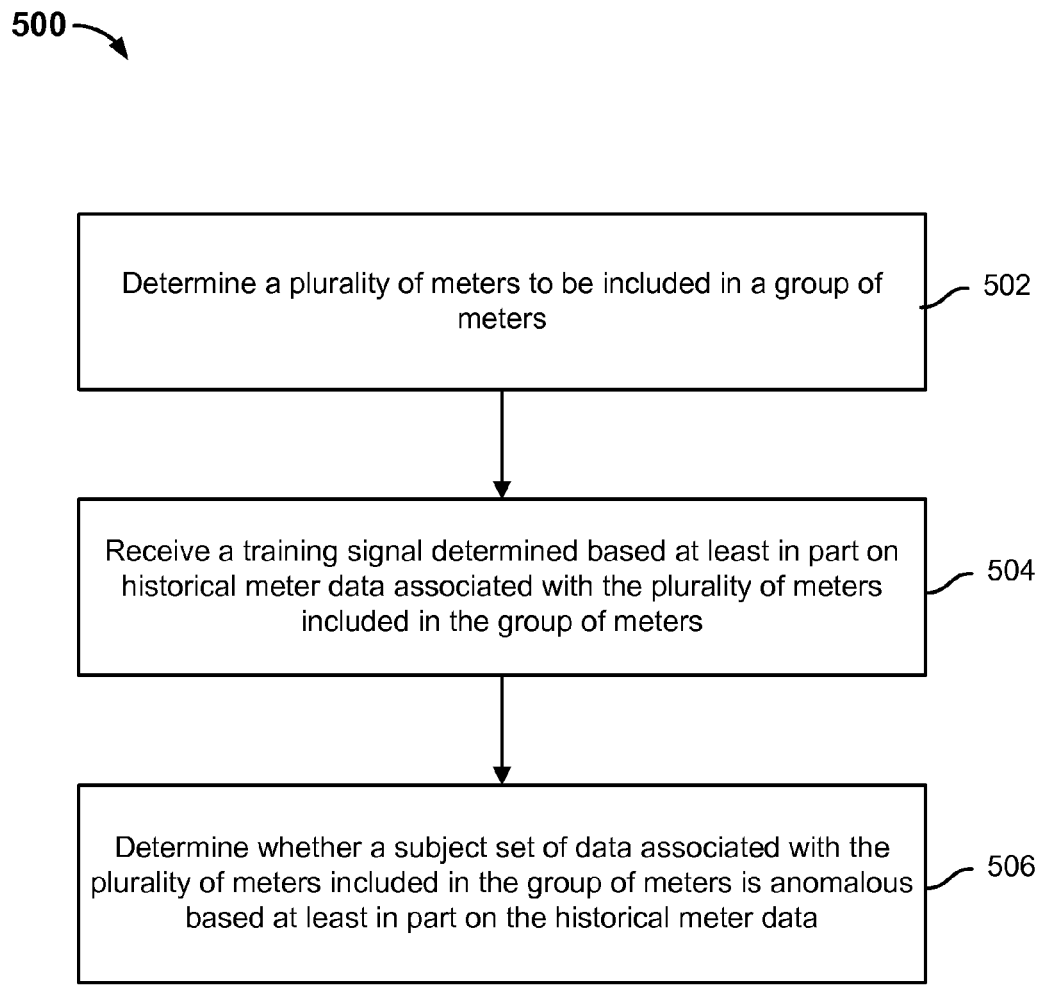
FIG. 5 is a flow diagram showing an embodiment of a process for determining whether a subject set of utility usage data associated with a meter that is associated with a group meter is anomalous.

FIG. 5 is a flow diagram showing an embodiment of a process for determining whether a subject set of utility usage data associated with a meter that is associated with a group meter is anomalous. In some embodiments, process 500 may be implemented at system 100.

Process 500 may be used when anomalous subject sets of utility usage data are determined with respect to a group of meters.

At 502, a plurality of meters to be included in a group of meters is determined. For example, a group of multiple meters may be determined based on a common attribute among the meters of the group. For example, meters that are located within a certain geographic radius may be determined to be within the same group. In another example, meters that are associated with the same manufacturer may be determined to be within the same group. Various other examples of including meters into the same group may be used.

For example, several meters from the Chicago area are determined to be in a group (e.g., based on the meters' common attribute of being located in the city of Chicago).

At 504, a training signal determined based at least in part on historical meter data associated with the plurality of meters included in the group of meters is received. For example, the meter readings associated with any of the meters included in this group of meters and also associated with a configured historical window of time may be retrieved from storage. Each meter reading may be associated with a time indication. In some embodiments, the set of historical meter readings may be transformed into a different spectrum (e.g., frequency) and reduced to a fewer number of transformed samples. In some embodiments, regardless of whether the historical meter readings are modified, the modified or unmodified set of historical meter readings are used as a training signal. The training signal is decomposed into at least a set of significant components that is used to represent the normal portion of the training signal.

Returning to the previous example, each meter of a group of meters produces readings every 30 minutes and so 48 readings are recorded each day. After readings from the meters in the group are collected and stored for a while, the set of historical readings associated with each meter in the group from a past time period, whether a single day, May 10, 2012, or a range of days, is retrieved from storage and a set of significant components may be decomposed from the historical meter data.

At 506, it is determined whether a subject set of data associated with the plurality of meters included in the group of meters is anomalous based at least in part on the historical meter data. In some embodiments, a subject set of data associated with a meter that is associated with the group of meters is compared against the set of significant components to determine whether the subject set is anomalous based on the set of significant components, as will be further discussed below. In some embodiments, the meter of the subject set may already be in the group of meters that is associated with the historical meter data. In some embodiments, the meter of the subject set may not already be in the group of meters that is associated with the historical meter data but rather is associated with an attribute that is common to the group (e.g., the meter of the subject set may be within the same geographic radius as the other meters in the group).

Returning to the previous example, a subject set of utility usage data comprising the readings from one meter (that is associated with the group of meters) for May 10, 2012 is considered for whether it is anomalous.

Figure 6:
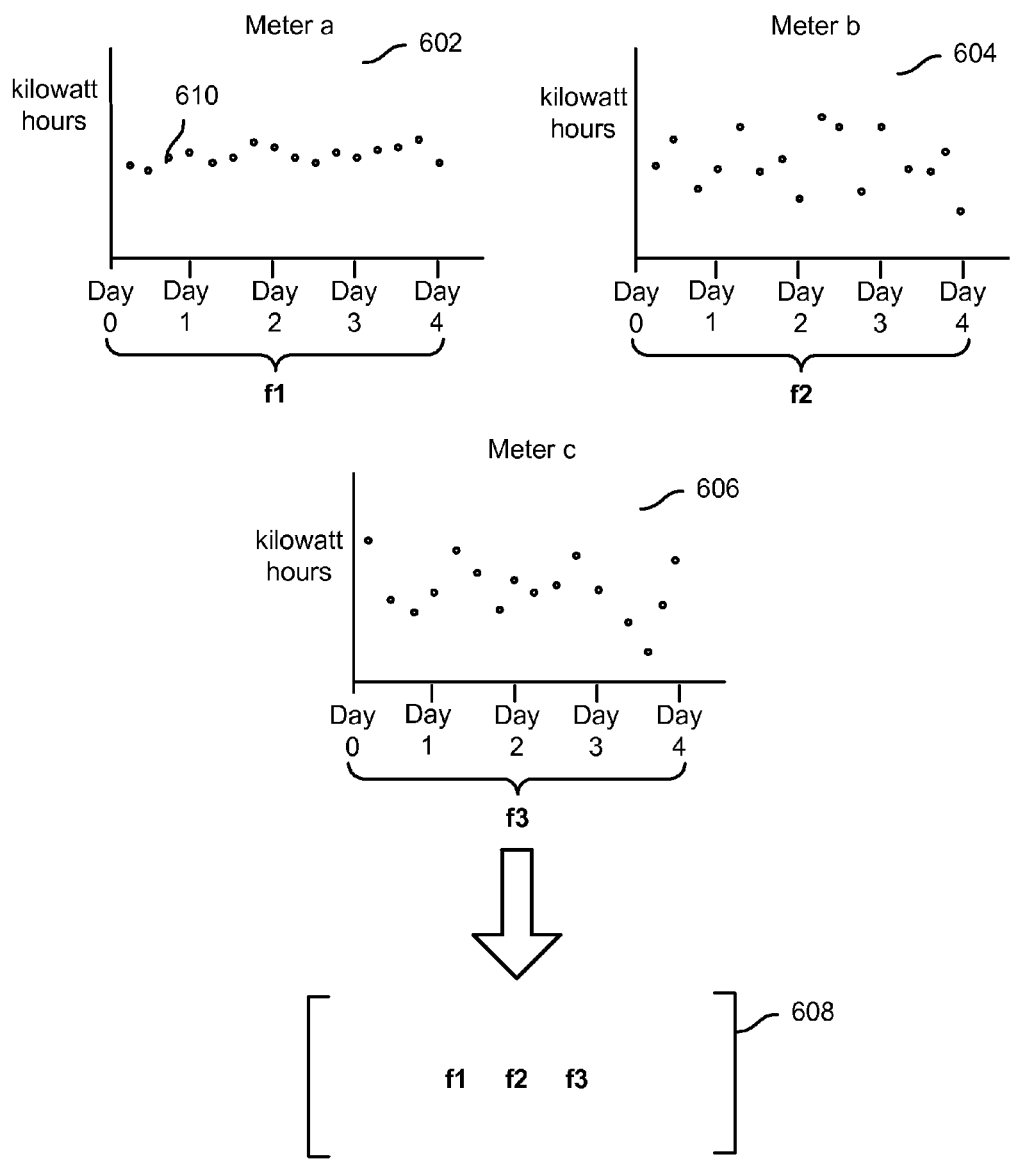
FIG. 6 shows an example of representing a training signal associated with a group of meters in matrix form.

FIG. 6 shows an example of representing a training signal associated with a group of meters in matrix form. Sometimes, placing data in matrix form will facilitate the use of analysis techniques on the data. In this example, the meters of the group that are under consideration include meters a, b, and c. In the example, each of meters a, b, and c measures energy usage in units of kilowatt hours. In the example, 602 shows the meter readings made by meter a over the course of Days 1, 2, 3, and 4, 604 shows the meter readings made by meter b over the course of Days 1, 2, 3, and 4, and 606 shows the meter readings made by meter c over the course of Days 1, 2, 3, and 4. In the example, each of meters a, b, and c takes four readings a day (or one reading once every 6 hours) and each such reading is represented by a plotted point such as point 610. In the example, the window of time over which historical meter data is to be analyzed is four days. In the example, the meter readings for each meter across the four days are included in a corresponding feature vector. While not shown in this example, the meter readings of each meter that are included in each feature vector may be first transformed into a set of transformed samples, for example, a set of spectral coefficients. Also not shown in the example, in place of the actual meter readings for each meter, a collection of statistical summaries based on the meter readings for each meter may be included in each feature vector. For example, a collection of statistical summaries may include the daily and weekly maximum, minimum, and average values of readings from a meter.

Returning to the present example, the meter readings (or values derived thereof such as their transformed values or their statistical summaries, for example) from meter a may be placed into feature vector $f_1$, the meter readings from meter b may be placed into feature vector $f_2$, and the meter readings from meter c may be placed into feature vector $f_3$. Then the feature vectors may be placed into feature matrix 608, where each feature vector forms a column in matrix 608. As such, a training signal associated with historical utility usage data may be set up in a matrix such as feature matrix 608 prior to being decomposed into significant components. In this example, a subject set of utility usage data to be determined for anomalous behavior may comprise a feature vector including meter readings (or values derived thereof) associated with a meter d (which is a new meter that is associated with the group including meters a, b, and c) and taken at the same resolution (four readings a day, one every 6 hours) as the meter readings in the historical meter data.

Figure 7:
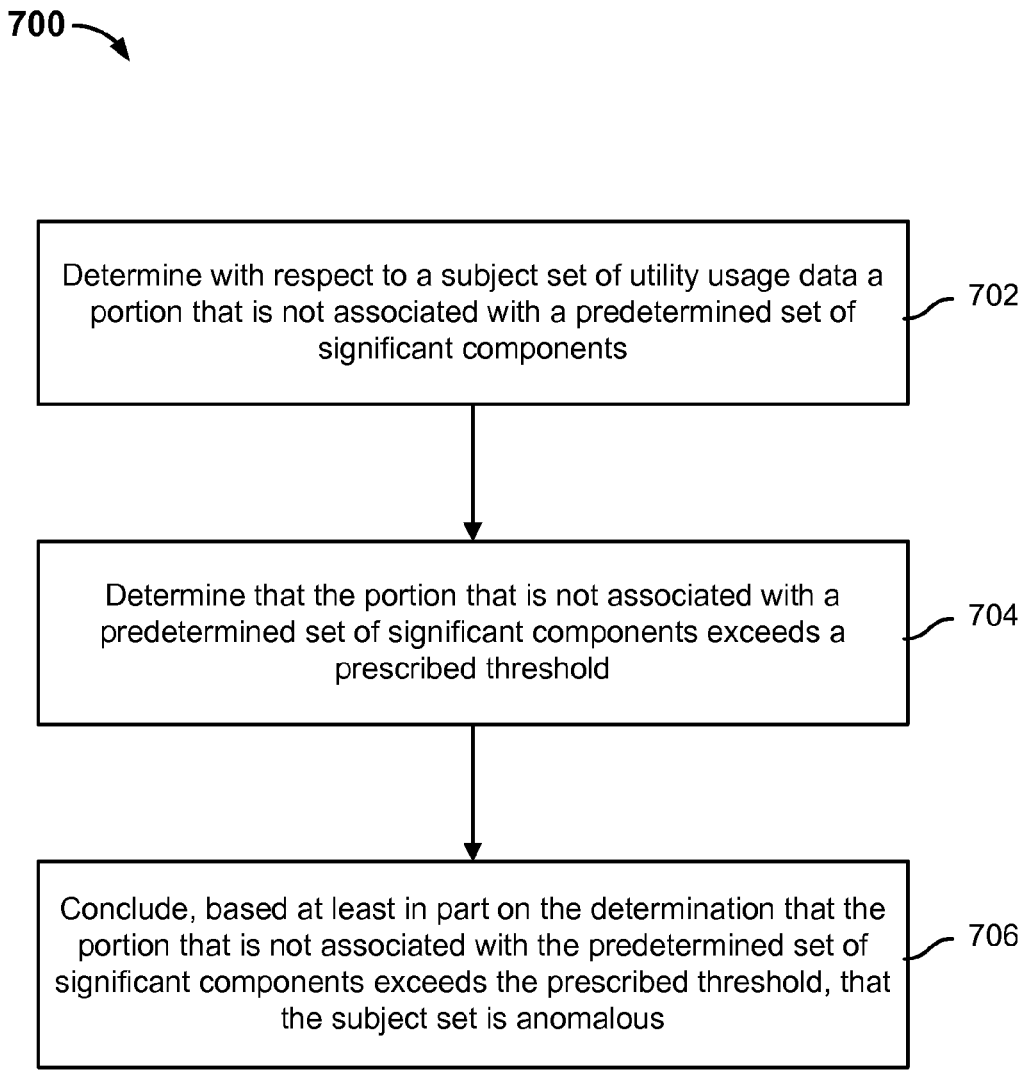
FIG. 7 is a diagram showing an embodiment of a process for determining anomalies with respect to utility usage data.

FIG. 7 is a diagram showing an embodiment of a process for determining anomalies with respect to utility usage data. In some embodiments, process 700 may be implemented at system 100.

At 702, it is determined with respect to a subject set of utility usage data, a portion that is not associated with a predetermined set of significant components. In some embodiments, a training signal is determined based at least in part on historical utility usage data (that comprise a series of meter readings corresponding to a window of time configured to comprise the historical period). In some embodiments, the historical utility usage data may be associated with a single meter. In some other embodiments, the historical utility usage data may be associated with multiple meters that form a group of meters. In some embodiments, the set of significant components is determined from decomposing the training signals. In some embodiments, the set of significant components may be a subset of a greater number of components into which the training signal was decomposed. The set of significant components is used to represent the portion of the historical meter data that is considered normal and therefore not considered to potentially indicate unauthorized behavior.

In some embodiments, the subject set of utility usage data (that also comprises a series of meter readings, or values derived thereof, corresponding to a time period associated with the subject set) is a set of data being considered for anomalous behavior. In some embodiments, the subject set is associated with the single meter. In some embodiments, the subject set is associated with a group of meters (e.g., the subject set may be associated with one meter out of the group of meters). In some embodiments, to determine the portion of the subject set of utility usage data that is not associated with the predetermined set of significant components includes determining the portion of the subject set that is outside of the set of significant components. One example mathematical representation of the portion of the subject set that is not associated with (i.e., is outside of) the set of significant components is the difference between the subject set and the subject set's projection onto the subspace spanned by the set of significant components. The portion of the subject set that is not associated with the set of significant components represents how much the subject set deviates from the portion of the training signal that is considered to be normal.

At 704, it is determined that the portion that is not associated with a predetermined set of significant components exceeds a prescribed threshold.

At 706, it is concluded, based at least in part on the determination that the portion that is not associated with the predetermined set of significant components exceeds the prescribed threshold, that the subject set is anomalous.

In some embodiments, the portion of the subject set that is not associated with the set of significant components is compared against a prescribed threshold. The threshold is configured to indicate that a subject set, with a portion of the subject set that is not supposed to be significant and that exceeds the threshold, is considered to be anomalous. In some embodiments, the threshold may be configured based on how sensitive a system administrator wants the system to be. For example, a lower threshold may be associated with a relatively more sensitive system in which a subject set that slightly deviates from the normal data would be considered to be anomalous. A sensitive system may be more cautious and would generate more alerts regarding anomalous data but of the alerts, few may lead to determinations of actual unauthorized behavior. Similarly, a higher threshold may be associated with a relatively less sensitive system such that only a subject set that heavily deviates from the normal data would be considered to be anomalous. A less sensitive system may be desired to avoid numerous alerts regarding anomalous data, but may overlook an actual incident of unauthorized behavior that was associated with a subject set that did not greatly deviate from the normal data.

In some embodiments, the prescribed threshold may be determined based at least in part on a portion of the training signal that was not associated with the set of significant components. To put it another way, the training signal may be decomposed into the set of significant components and a set of data that is not associated with (i.e., is outside of) the set of significant components and, in some embodiments, this set of data that is not associated with (i.e., is outside of) the set of significant components may be used to determine the prescribed threshold.

Figure 8:
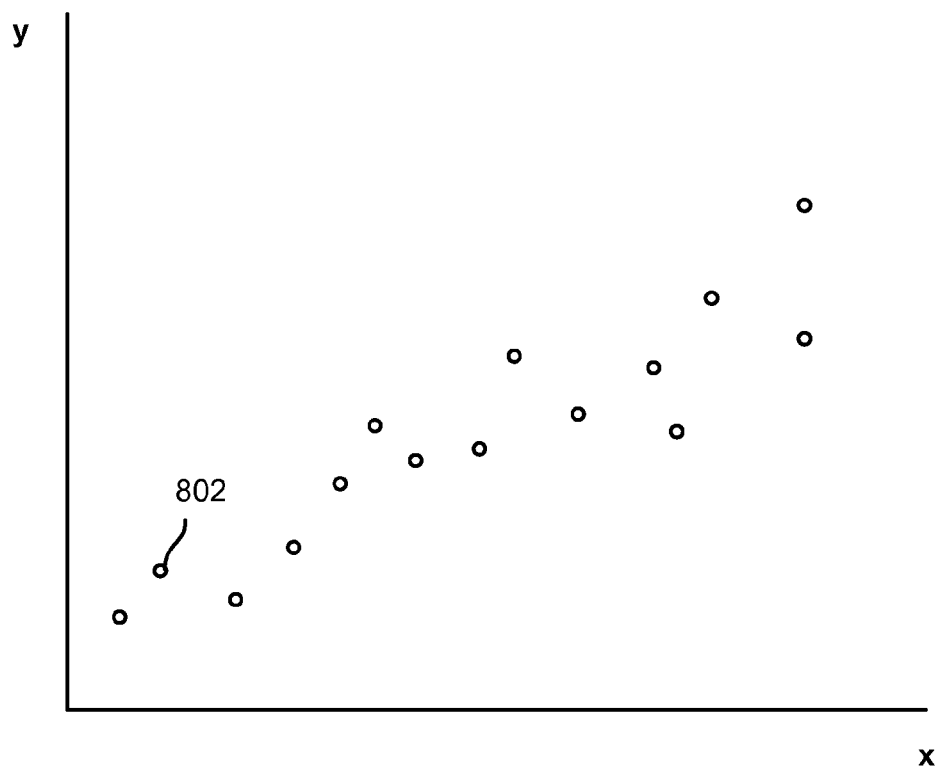
FIG. 8 is a diagram showing a set of data that is plotted on an x-y graph.
Figure 9:
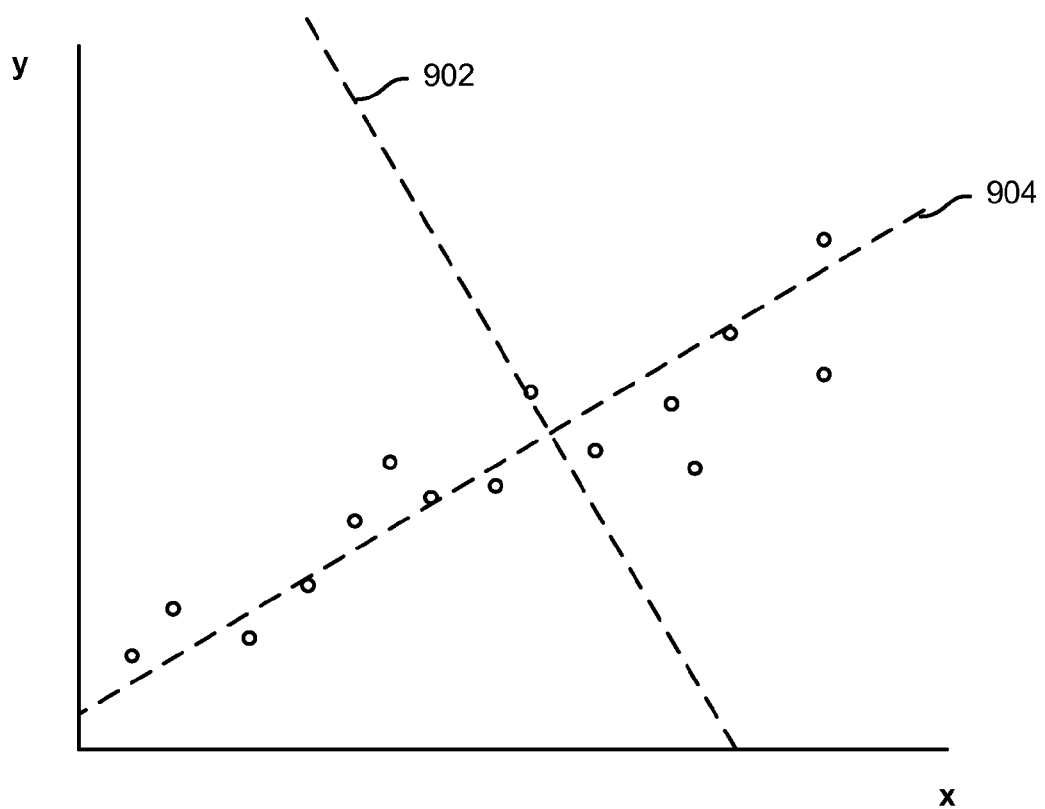
FIG. 9 is a diagram showing a set of data that is plotted on an x-y graph with plots of two eigenvectors overlaying the plot.

FIGS. 8 and 9 are examples used to illustrate a simple example of applying the principal component analysis on a set of two-dimensional data.

FIG. 8 is a diagram showing a set of data that is plotted on an x-y graph. Each point in the set of data, such as point 802, is represented by an (x,y) coordinate. Principal component analysis may be applied to this data set to identify characteristics in the data.

FIG. 9 is a diagram showing a set of data that is plotted on an x-y graph with plots of two eigenvectors overlaying the plot. A known type of decomposition (e.g., eigenvector decomposition or singular value decomposition) may be applied to the set of data to yield a set of two eigenvectors and two eigenvalues that respectively correspond to the eigenvectors. The two eigenvectors are orthogonal to each other and each eigenvector provides information about the patterns in the data. The two eigenvectors are plotted as dotted diagonal lines 902 and 904. As can be seen from the data, diagonal line 902 of the first eigenvector cuts through the middle of the data and shows how the set of data is related (like a line of best fit). The diagonal line 904 of the second eigenvector indicates that all the points follow diagonal line 902 of the first eigenvector but are off to the side of diagonal line 902 by some amount. The significance of each of the eigenvectors is indicated by its corresponding eigenvalue. The higher the eigenvalue, the more principal or significant the corresponding eigenvector (component) is. As such, the eigenvector corresponding to the highest eigenvalue is the most principal component of the set. In this example, the eigenvalue corresponding to the first eigenvector represented by diagonal line 902 is the higher of the two eigenvalues and so the first eigenvector is the more significant component and therefore represents the most significant relationship between the data dimensions. Optionally, one or more eigenvectors associated with lower significance such as the second eigenvector in this example may be ignored without losing too much information. If one or more eigenvectors associated with lower significance are ignored, the final data set will have fewer dimensions than the original data set. The remaining principal component(s) may then be used to represent the original data in a more compact but somewhat lossy manner.

In applying the principal component analysis technique, in some embodiments, the portion of the training utility usage data that is included in the determined set of principal components is used to represent the "normal" utility usage data (i.e., normal utility usage data does not need to be flagged for further inspection). As such, the portion of a subject set of utility usage data that is determined to be outside of this set of principal components is considered to be the amount that the subject set deviates from the normal data and so should not be very significant. However, if such a deviation exceeds a threshold, then the subject set may be considered to be anomalous, as will be further described in FIG. 10.

Figure 10:
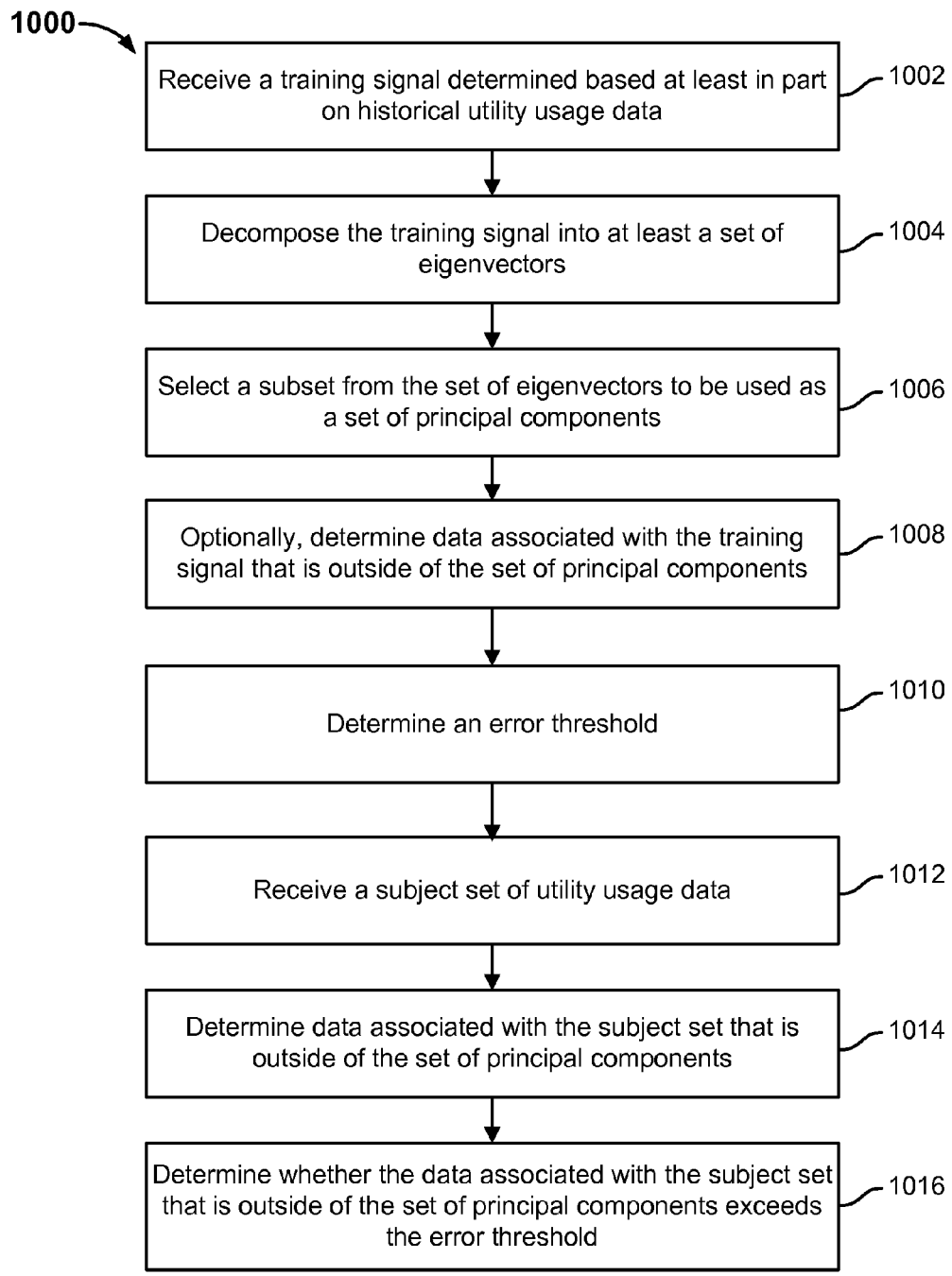
FIG. 10 is a flow diagram showing an example of a process for determining anomalies with respect to utility usage data using principal component analysis.

FIG. 10 is a flow diagram showing an example of a process for determining anomalies with respect to utility usage data using principal component analysis. In some embodiments, process 1000 may be implemented at system 100. In some embodiments, process 700 may be implemented using process 1000.

At 1002, a training signal determined based at least in part on historical utility usage data is received. In some embodiments, historical utility usage data associated with either a single meter or a group of multiple meters is retrieved. In some embodiments, the historical utility usage data (e.g., set of historical meter readings with corresponding time indications) is retrieved from a configured window of time in the past. In some embodiments, the retrieved meter readings are transformed into a different domain (e.g., from the time domain to the frequency domain) prior to being used as the training signal. In some embodiments, in addition or alternative to transforming the retrieved meter readings, statistical summaries (e.g., mean, media) are derived from the retrieved (transformed or not transformed) meter readings. In some embodiments, the historical meter readings or values derived thereof may be used as the training signal. In some embodiments, the data of the training signal are arranged in a matrix so that principal component analysis may be applied to it.

For example, the historical utility usage data may be associated with a single meter that produces M readings each day. For example, M may be configured to be 48, so a reading occurs every 30 minutes and so the meter produces M=48 readings a day, each of which is stored. The historical readings from this meter for T number of past days are to be used in this example as the training signal. The M readings for each day of the period of T days may be placed in a feature vector. Thus, the result is a matrix X of dimensions M×T, where each column represents a feature vector comprising readings from the meter at each day within the period of T days, and where each row represents the readings at the same time across each of the period of T days.

For another example, the historical utility usage data may be associated with a group of L meters that each produces P readings each day over R days. R may be configured to be 60. P may be configured to be 48, so a reading occurs every 30 minutes and each meter produces 48*60=2880 readings over the 60 day period, each of which is stored. Each meter's reading is transformed to m spectral coefficients. For example, N may be configured to be 128 so every meter is represented by 128 coefficients. The transformed historical signals from these meters are to be used in this example as the training signal. The N readings for each of L meters may be placed in a feature vector. Thus, the result is a matrix X of dimensions N×L, where each column represents a feature vector comprising transformed readings from a meter over R days.

At 1004, the training signal is decomposed into at least a set of eigenvectors. In some embodiments, principal component analysis is applied to the training signal. In performing principal component analysis, the training signal is decomposed into various components that characterize the overall training signal. Each such component may be represented by an eigenvector and may represent a different characteristic of the training signal. Examples of decomposition techniques include eigenvector decomposition and singular value decomposition.

At 1006, a subset from the set of eigenvectors is selected to be used as a set of principal components. In some embodiments, each of the set of eigenvectors is associated with a different variance. Each of the set of eigenvectors is associated with an eigenvalue and the eigenvectors of the set are ranked based on their respective eigenvalues. The eigenvector with the highest eigenvalue (e.g., this eigenvector accounts for the greatest variance and therefore has the most significant relationship between the data dimensions) is considered to be the most principal and significant. Because the eigenvectors are ranked in significance by their eigenvalues, one or more eigenvectors with the lowest eigenvalues may be ignored without losing much of the original data. The eigenvectors that are not ignored are referred to as a set of principal components or significant components. The number of eigenvectors to include in the set of principal components or significant components may be configured, as will be described using examples below. By ignoring eigenvectors, the original dimension of the training signal may be reduced to speed up processing of the remaining set of significant components. The selected set of principal components represents the normal portion of the training signal.

Returning to the previous example where the historical utility usage data may be associated with a single meter that produces M readings each day, the matrix X of dimensions M×T may be decomposed into a set of eigenvectors and k (where k is an integer that is greater than 0) of the eigenvectors are selected to form the set of principal components. The k eigenvectors of the set of principal components are placed in a matrix P, which has dimensions of M×k.

At 1008, optionally, data associated with the training signal that is outside of the set of principal components is determined. The data associated with the training signal that is outside of the set of principal components represents the less significant portion of the training signal. In some embodiments, this less significant portion of the training signal may even be labeled as "noise," though the term "noise" is merely used to indicate that such data was not selected to be included in the set of significant components. One example representation of the mathematical representation of the data associated with the training signal that is outside of the set of principal components is the difference between the transpose matrix of the training signal and the portion of the transpose of the training signal that is projected onto the subspace spanned by the set of principal components.

Returning to the previous example where the historical utility usage data may be associated with a single meter that produces M readings each day, $X^T$ represents the transpose matrix of matrix X, $PP^T$ represents the subspace spanned by the set of principal components, and $PP^T X^T$ represents the projection of X to the subspace spanned by the set of principal components. So the portion of the matrix X that is outside of the set of principal components is $X'=(I-PP^T) X^T$, where I represents the identity matrix of dimensions M×M. Similarly, given a feature vector x of dimension M×1, the portion of the vector x that is outside of the set of principal components is $x'=(I-PP) x^T$.

At 1010, an error threshold is determined. In some embodiments, the error threshold that is used to determine whether a subject set of utility usage data is anomalous may be determined based on the portion of the training signal that is determined to be outside of the set of principal components. In some other embodiments, the error threshold may be empirically determined or configured based on other statistical factors. However the error threshold is determined, the error threshold is set to indicate the maximum threshold that the less significant components of the subject set may be without causing the subject set to be labeled as anomalous and if the threshold is exceeded, then such noise components may indicate that the subject set cannot be fully explained by the set of principal components and is therefore anomalous.

Returning to the previous example where the historical utility usage data may be associated with a single meter that produces M readings each day, the error threshold can be statistically established based on some statistical metric. For example, for each of T feature vectors x in X, denoted by $x_y$, $1 \leq y \leq T$, compute its $e_y = \|x_y'\|$, which is the portion of the vector that is outside of the set of principal components. The error threshold may be represented by the variable of $error_{threshold} = (mean(\{e_y\}) + s*stddev(\{e_y\}))$, where mean ($\{e_y\}$) is the mean value of all $e_y$, stddev($\{e_y\}$) is the standard deviation of all $e_y$, and s is a configured standard scaling factor that is controlled by a system operator for the desired level of anomaly detection sensitivity.

At 1012, a subject set of utility usage data is received. In some embodiments, the subject set of utility usage data is one that is to be considered for whether it is anomalous or not. For example, the subject set of utility usage data also comprises a series of meter readings with corresponding time indications. In some embodiments, the time period over which the subject set was recorded may be at least partially overlapping with the window of time with which the historical utility usage data is associated. In some embodiments, if the historical utility usage data is associated with a single meter, then the subject set of utility usage data is also associated with that single meter. If the historical utility usage data is associated with a group of multiple meters, then the subject set of utility usage data is also associated with that group of multiple meters.

Returning to the previous example where the historical utility usage data may be associated with a single meter that produces M readings each day, the subject set of utility usage data is represented by vector $x_t$, which comprises a day's worth of readings from the meter from day t. Thus, $x_t$ forms a vector of size M=48.

At 1014, data associated with the subject set that is outside of the set of principal components is determined. In some embodiments, the portion of the subject set of utility usage data that is outside of the set of principal components represents what should be the less significant components of the subject set. The portion of the subject set that is associated with the set of principal components is in some embodiments considered to be within what should be the normal space of utility usage data (as determined using the training signal, for example), and so the difference between the subject set and this portion comprises what should be the relatively less significant or the "noise" portion of the subject set. If this portion of the subject set that is expected to be relatively insignificant exceeds a predetermined threshold, in some embodiments the subject set is considered anomalous and therefore warrants further inspection.

Returning to the previous example where the historical utility usage data may be associated with a single meter that produces M readings each day, $x_t$ represents the vector corresponding to the subject set of utility usage data, $PP^T$ represents the subspace spanned by the set of principal components, and $PP^T x_t$ represents the projection of $x_t$ to the subspace spanned by the set of principal components. So the portion of the vector $x_t$ that is outside of the set of principal components is $x_t' = (I - PP) x_t$, where I represents the identity matrix of dimensions M×M.

At 1016, it is determined whether the data associated with the subject set that is outside of the set of principal components exceeds the error threshold. In some embodiments, and prediction error value is determined based on the determined data associated with the subject set that is outside of the set of principal components. Then the prediction error value is compared against the error threshold and if the error threshold is exceeded, then the subject set is considered anomalous and the subject set is flagged for further analysis. Otherwise, if the prediction error value is compared against the error threshold and the error threshold is not exceeded, then the subject set is not considered anomalous and the subject set is not flagged for further analysis. Because the prediction error value of the subject set of utility usage data represents the less significant components or noise components of the subject set, if such a portion of the subject set exceeds the set error threshold, then the occurrence represents that the less significant component or noise components of the subject set cannot be fully explained by the set of principal components and should therefore be inspected further for indications of unauthorized actions.

Returning to the previous example, the squared prediction error for day t is represented as $e_t = \|x_t'\|^2$. If $e_t > error_{threshold}$, then the subject set $x_t$ will be considered anomalous.

Figure 11:
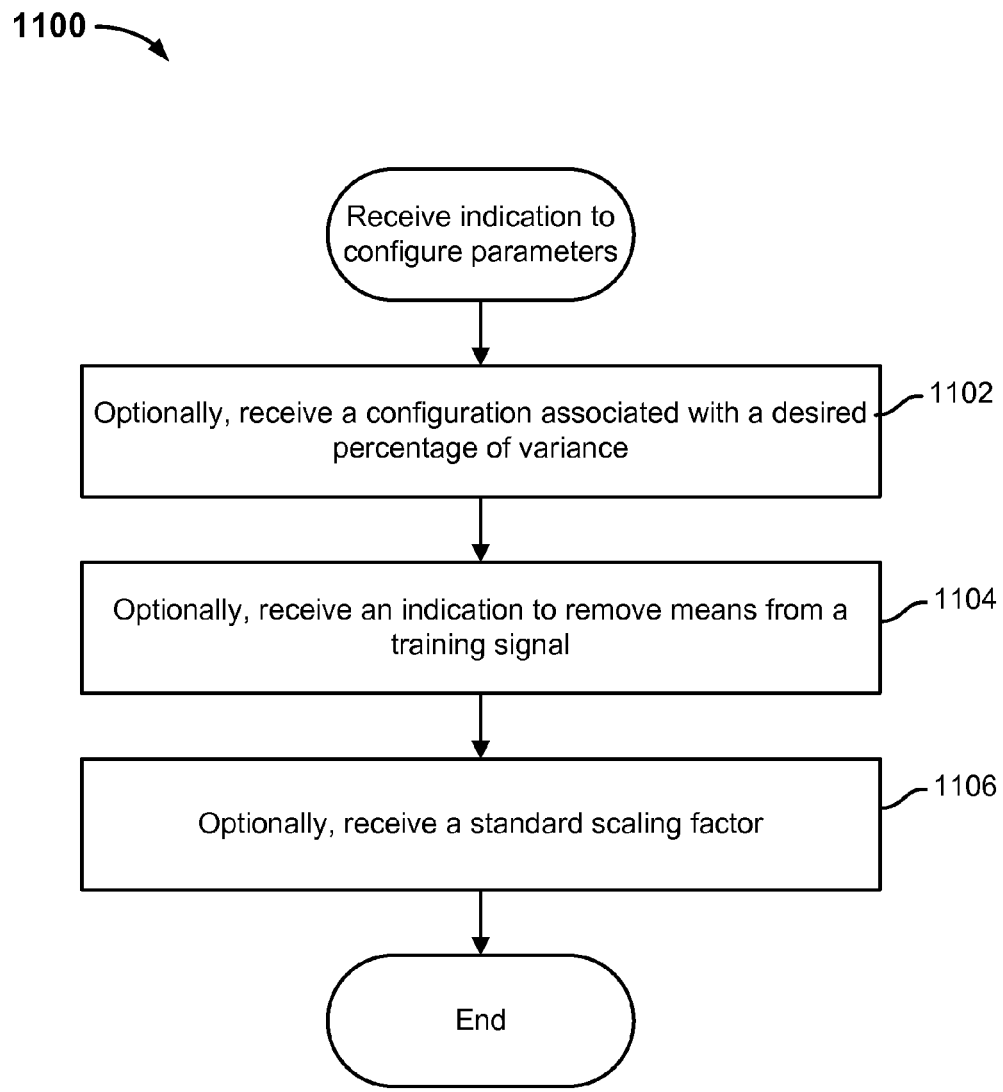
FIG. 11 is a flow diagram showing examples of parameters that may be configured to modify the application of principal component analysis.

FIG. 11 is a flow diagram showing examples of parameters that may be configured to modify the application of principal component analysis. In some embodiments, process 1100 may be initiated in response to receipt of an indication to configure parameters.

Each of 1102, 1104, and 1106 is associated with a parameter that may be configured to modify the application of principal analysis in some embodiments of detecting anomalous utility usage. While parameters associated with 1102, 1104, and 1106 are shown in the flow diagram, fewer or additional parameters may be configured as well.

At 1102, a configuration associated with a desired percentage of variance is optionally received. In some embodiments, a desired percentage of variance is configured, where the desired percentage of variance is used to determine how many eigenvectors into which the training signal is decomposed is selected to form the set of principal components. As mentioned above, each eigenvector corresponds to an eigenvalue that indicates the variance associated with that eigenvector. The eigenvectors may be ranked based on their respective eigenvalues (and therefore variances) and the least number of eigenvectors with the highest eigenvalues that capture the desired percentage of variance may be selected to form the set of principal components. An example associated with using the desired percentage of variance with respect to the singular value decomposition technique is discussed with FIG. 12 below.

At 1104, an indication to remove means from a training signal is optionally received. In some embodiments, prior to performing a decomposition, a mean value is determined for each column of the matrix associated with the training data and that mean value is subtracted from each value in its respective column.

At 1106, a standard scaling factor is optionally received. In some embodiment, a configured parameter that controls the magnitude of error threshold may be configured to control the volume of alerts with respect to subject sets of utility usage data that are determined to be anomalous.

Returning to the example of FIG. 10, in the expression error$_{threshold}$=(mean({e$_y$})+s*stddev({e$_y$})), parameter s controls the magnitude of the error threshold.

FIG. 12 is a diagram showing an example of singular value decomposition. In some embodiments, singular value decomposition may be used to decompose the training signal into several components and to select the set of principal components. As shown in the example, the singular value decomposition states that X=UD V$^T$, where X is a matrix of dimensions m×n, U is a matrix of dimensions m×m, D is a matrix of dimensions m×n, and V$^T$ is a matrix of dimensions n×n. The columns of matrix U are the left singular; matrix D has singular values and is diagonal; and matrix V$^T$ has rows that are the right singular vectors. The columns of matrices U comprise set of eigenvectors eig$_1$ through eig$_m$ and V$^T$ comprises set of eigenvectors EIG$_1$ through EIG$_n$. The eigenvectors of matrix U are arranged from left to right in terms of being associated with directions of the greatest variance. So, the first eigenvector, eig$_1$ of matrix U corresponds to a direction in which the data vectors point to the greatest variance. The diagonal values of matrix D comprise the corresponding eigenvalues to eigenvectors eig$_1$ through eig$_m$ of matrix U and are also arranged in descending order from left to right. For example, value d$_1$ is the greatest value of d$_1$ through d$_m$ and corresponds to eigenvector eig$_1$ of matrix U. In other words, the magnitudes of the diagonal values of matrix D correspond to the respective variances of the eigenvectors eig$_1$ through eig$_m$ of matrix U. At least a subset of eigenvectors is selected from matrix U to form the set of principal components (eigenvectors) for matrix X.

In some embodiments, matrix X may represent the training signal determined based at least in part on historical utility usage data. In some embodiments, which subset of eigenvectors should be selected from matrix U to form the set of principal components (eigenvectors) for matrix X may be based on the corresponding diagonal values of matrix D and a configured desired percentage of variance (e.g., as received during a process such as process 1100). As mentioned above, each diagonal value of matrix D corresponds to the variance of the associated eigenvector of matrix U. So, the sum of all the diagonal values of matrix D corresponds to the full extent (100%) of the variance associated with the eigenvectors of matrix U and so the sum of fewer than all of the diagonal values of matrix D corresponds to a percentage less than 100% of the variance. In some embodiments, the set of principal components may comprise the least number of eigenvectors from matrix U such that the sum of the corresponding diagonal values from matrix D captures at least the desired percentage of variance.

For example, assume that k represents the number of eigenvectors that is to be selected from matrix U to form the set of principal components for matrix X. In this example, the desired percentage of variance is configured to be 90%. To obtain k, equation (1) may be solved.

$$\frac{\sum_{i=1}^{k} d_i}{\sum_{i=1}^{m} d_i} > 90\% \quad (1)$$

where $\Sigma_{i=1}^{k} d_i$ represents the variance captured by the first k values from matrix D (and therefore the first k number of eigenvectors from matrix U) $\Sigma_{i=1}^{m}$ and d$_i$ represents the 100% variance associated with all of eigenvectors eig$_1$ through eig$_m$ of matrix U. In some embodiments, equation (1) may be solved to obtain k and the first k number of eigenvectors from matrix U may be selected to form the set of principal components to be used in detecting anomalous subject sets of utility usage data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system of anomalous utility usage detection, comprising:
   a memory or other storage device configured to store a subject set of utility usage data; and
   a processor coupled to the memory or other storage device and configured to:
   analyze a set of historical utility usage data associated with one or more readings over a particular window of time and derive a plurality of components from the set of historical utility usage data, wherein each of the plurality of components represents a characteristic of the set of historical utility usage data;
   select a subset of the plurality of components to use as a set of significant components, wherein the plurality of components is associated with a corresponding plurality of significance values, wherein the subset of the plurality of components is selected based at least in part on the corresponding plurality of significance values, wherein the set of significant components is selected to represent normal utility usage data;
   determine with respect to the subject set of utility usage data a portion that is not associated with the set of significant components;
   determine that the portion that is not associated with the set of significant components exceeds a prescribed threshold, wherein the portion that is not associated with the set of significant components corresponds to a difference between the subject set of utility usage data and a projection of the subject set of utility usage data onto a subspace spanned by the set of significant components; and
   conclude, based at least in part on the determination that the portion that is not associated with the set of significant components exceeds the prescribed threshold, that the subject set of utility usage data is anomalous; and
   wherein, the plurality of components is decomposed from the set of historical utility usage data using a principal component analysis that comprises:
   determining one or more eigenvectors associated with a training matrix generated using the set of historical usage data;
   determining one or more eigenvalues respectively corresponding to the one or more eigenvectors; and
   selecting the set of significant components based at least in part on the one or more eigenvalues respectively corresponding to the one or more eigenvectors.

2. The system of claim 1, wherein the subject set of utility usage data is associated with a meter and the set of significant components is associated with the meter.

3. The system of claim 1, wherein the subject set of utility usage data is associated with a group of meters and the set of significant components is associated with the group of meters.

4. The system of claim 1, wherein the corresponding plurality of significance values associated with the plurality of components comprises a plurality of variances.

5. The system of claim 4, wherein the processor is further configured to receive a configuration associated with a desired percentage of variance to use to select the subset of the plurality of components.

6. The system of claim 1, wherein the set of historical utility usage data comprises a series of recorded meter readings and corresponding time indications.

7. The system of claim 1, wherein the set of significant components is determined based at least in part on a transformation applied to the set of historical utility usage data.

8. The system of claim 1, wherein the prescribed threshold is determined based at least in part on a portion of the set of historical utility usage that is outside of the set of significant components.

9. The system of claim 1, wherein the processor is further configured to display an alert associated with information associated with the determination of the subject set of utility usage data as being anomalous.

10. A method of anomalous utility usage detection, comprising:
    analyzing a set of historical utility usage data associated with one or more readings over a particular window of time and deriving a plurality of components from the set of historical utility usage data, wherein each of the plurality of components represents a characteristic of the set of historical utility usage data;
    selecting a subset of the plurality of components to use as a set of significant components, wherein the plurality of components is associated with a corresponding plurality of significance values, wherein the subset of the plurality of components is selected based at least in part on the corresponding plurality of significance values, wherein the set of significant components is selected to represent normal utility usage data;
    determining, using one or more processors, with respect to the subject set of utility usage data a portion that is not associated with the set of significant components;
    determining that the portion that is not associated with the set of significant components exceeds a prescribed threshold, wherein the portion that is not associated with the set of significant components corresponds to a difference between the subject set of utility usage data and a projection of the subject set of utility usage data onto a subspace spanned by the set of significant components; and
    concluding, based at least in part on the determination that the portion that is not associated with the set of significant components exceeds the prescribed threshold, that the subject set of utility usage data is anomalous; and
    wherein, the plurality of components is decomposed from the set of historical utility usage data using a principal component analysis that comprises:
    determining one or more eigenvectors associated with a training matrix generated using the set of historical usage data;
    determining one or more eigenvalues respectively corresponding to the one or more eigenvectors; and
    selecting the set of significant components based at least in part on the one or more eigenvalues respectively corresponding to the one or more eigenvectors.

11. The method of claim 10, wherein the subject set of utility usage data is associated with a meter and the set of significant components is associated with the meter.

12. The method of claim 10, wherein the subject set of utility usage data is associated with a group of meters and the set of significant components is associated with the group of meters.

13. The method of claim 10, wherein the corresponding plurality of significance values is associated with the plurality of components comprises a plurality of variances.

14. The method of claim 13, further comprising receiving a configuration associated with a desired percentage of variance to use to select the subset of the plurality of components.

15. The method of claim 10, wherein the set of historical utility usage data comprises a series of recorded meter readings and corresponding time indications.

16. The method of claim 10, wherein determining the portion that is not associated with the set of significant components includes determining a degree to which the subject set of utility usage data deviates from the set of significant components.

17. The method of claim 10, wherein the training matrix is generated using the set of historical utility usage data.

18. The method of claim 10, further comprising:
    in response to concluding that the subject set of utility usage data is anomalous, sending, to a user, an alert indicating that the subject set of utility usage data is anomalous.

19. A computer program product for anomalous utility usage detection, the computer program product being embodied in a non-transitory computer readable storage medium and comprising computer instructions for:
    analyzing a set of historical utility usage data associated with one or more readings over a particular window of time and deriving a plurality of components from the set of historical utility usage data, wherein each of the plurality of components represents a characteristic of the set of historical utility usage data;
    selecting a subset of the plurality of components to use as a set of significant components, wherein the plurality of components is associated with a corresponding plurality of significance values, wherein the subset of the plurality of components is selected based at least in part on the corresponding plurality of significance values, wherein the set of significant components is selected to represent normal utility usage data;
    determining with respect to the subject set of utility usage data a portion that is not associated with the set of significant components;
    determining that the portion that is not associated with the set of significant components exceeds a prescribed threshold, wherein the portion that is not associated with the set of significant components corresponds to a difference between the subject set of utility usage data and a projection of the subject set of utility usage data onto a subspace spanned by the set of significant components; and
    concluding, based at least in part on the determination that the portion that is not associated with the set of significant components exceeds the prescribed threshold, that the subject set of utility usage data is anomalous; and
    wherein, the plurality of components is decomposed from the set of historical utility usage data using a principal component analysis that comprises:
    determining one or more eigenvectors associated with a training matrix generated using the set of historical usage data;

determining one or more eigenvalues respectively corresponding to the one or more eigenvectors; and selecting the set of significant components based at least in part on the one or more eigenvalues respectively corresponding to the one or more eigenvectors.

20. The computer product of claim 19, further comprising instructions for:

generating the training matrix using the set of historical utility usage data.

\* \* \* \* \*